(12) United States Patent
Eick et al.

(10) Patent No.: US 10,514,474 B2
(45) Date of Patent: Dec. 24, 2019

(54) METHOD FOR SYNCHRONIZING CONTINUOUS SEISMIC SURVEY

(71) Applicant: CONOCOPHILLIPS COMPANY, Houston, TX (US)

(72) Inventors: Peter M. Eick, Houston, TX (US); Joel D. Brewer, Houston, TX (US)

(73) Assignee: ConocoPhillips Company, Houston, TX (US)

(*) Notice: Subject to any disclaimer, the term of this patent is extended or adjusted under 35 U.S.C. 154(b) by 568 days.

(21) Appl. No.: 14/476,107

(22) Filed: Sep. 3, 2014

(65) Prior Publication Data

US 2015/0078128 A1    Mar. 19, 2015

Related U.S. Application Data

(60) Provisional application No. 61/880,000, filed on Sep. 19, 2013.

(51) Int. Cl.
*G01V 1/00* (2006.01)
*G01V 1/22* (2006.01)

(52) U.S. Cl.
CPC ............. *G01V 1/223* (2013.01); *G01V 1/005* (2013.01)

(58) Field of Classification Search
CPC .............................. G01V 1/005; G01V 1/223
USPC ............................................. 367/27, 77, 37
See application file for complete search history.

(56) References Cited

U.S. PATENT DOCUMENTS

| | | | |
|---|---|---|---|
| 2,901,543 A | 8/1959 | Braak | |
| 3,626,267 A * | 12/1971 | Bobbitt | H03H 17/08 318/603 |
| 4,493,067 A * | 1/1985 | Thomas | G01V 1/04 181/107 |
| 4,644,526 A | 2/1987 | Wu | |
| 5,623,455 A | 4/1997 | Norris | |
| 6,070,129 A | 5/2000 | Grouffal et al. | |
| 7,124,028 B2 | 10/2006 | Ray et al. | |
| 7,218,890 B1 | 5/2007 | Iseli et al. | |
| 7,295,490 B1 * | 11/2007 | Chiu | G01V 1/005 367/41 |
| 7,298,671 B2 | 11/2007 | Brinkmann et al. | |
| 9,310,498 B2 * | 4/2016 | Howe | G01V 1/005 |
| 2008/0049554 A1 | 2/2008 | Crice et al. | |
| 2009/0052439 A1 | 2/2009 | Chan et al. | |

(Continued)

OTHER PUBLICATIONS

"Carrier sense multiple access," Wikipedia, Aug. 24, 2012, downloaded Apr. 13, 2016 from https://en.wikipedia.org/w/index.php?title=Carrier_sense_multiple_access&oldid=508882144, 3 pp.*

(Continued)

*Primary Examiner* — Daniel L Murphy
(74) *Attorney, Agent, or Firm* — Polsinelli PC (57) ABSTRACT

The present invention relates to a method for synchronizing continuous seismic survey. In particular, the present invention employs a semaphore scheme for the vibes to autonomously and continuously initiate sweeps, thereby decoupling the vibratory source subsystem from the recording subsystem. By using a continuous recorder and the method of the present invention, the recording trucks and the observers can be eliminated, and the vibratory sources can be initiated more efficiently than conventional systems.

20 Claims, 3 Drawing Sheets

(56) References Cited

U.S. PATENT DOCUMENTS

2010/0103772 A1  4/2010  Eick et al.
2010/0199772 A1  8/2010  Bagaini

OTHER PUBLICATIONS

International Search Report. PCT/US2014/053874. dated Dec. 30, 2014.
Bowman et al. Real-Time Classification of Signals From Three-Compnent Seismic Sensors Using Neural Nets. IEEE Transactions on Instrumentation and Measurement and 4th Institut Industriel De Transfert De Technologie (IITT); International Conference on Artificial Intelligence and Expert Systems. 1992.

\* cited by examiner

METHOD FOR SYNCHRONIZING CONTINUOUS SEISMIC SURVEY

CROSS-REFERENCE TO RELATED APPLICATIONS

This application is a non-provisional application which claims benefit under 35 USC § 119(e) to U.S. Provisional Application Ser. No. 61/880,000 filed Sep. 19, 2013, entitled "METHOD FOR SYNCHRONIZING CONTINUOUS SEISMIC SURVEY," which is incorporated herein in its entirety.

FEDERALLY SPONSORED RESEARCH STATEMENT

Not applicable.

REFERENCE TO MICROFICHE APPENDIX

Not applicable.

FIELD OF THE INVENTION

The invention relates to a method for synchronizing continuous seismic survey, and more particularly to a method for synchronizing continuous ZenSeis™ seismic surveys.

BACKGROUND OF THE INVENTION

Seismic surveys image or map the subsurface of the earth by imparting acoustic energy into the ground and recording the reflected energy or "echoes" that return from the rock layers below. The source of the acoustic energy can be generated by explosions, air guns vibrators, and the like. The energy source is positioned on or near the surface of the earth. Each time the energy source is activated it generates a seismic signal that travels into the earth, is partially reflected, and, upon its return, may be detected at many locations on the surface as a function of travel time. The sensors used to detect the returning seismic energy commonly include geophones, accelerometers, and hydrophones. The returning seismic energy is recorded as a continuous signal representing displacement, velocity, acceleration, or other recorded variation as a function of time. Multiple combinations of energy source and sensor can be subsequently combined to create a near continuous image of the subsurface that lies beneath the survey area. One or more sets of seismic signals may be assembled in the final seismic survey.

The acquisition of seismic data is an expensive undertaking and any time savings can amount to significant cost savings. One significant time saver has been the development of phase separated seismic prospecting which makes it possible to acquire seismic data from a number of shot points simultaneously to increase the number of shot points shaken in a day and ultimately substantially reduces the number of days to acquire the data for a survey area. While the amount of time that the vibes spend at a single shot point is longer, at the end of the series of sweeps, several shot points have been "completed" and the vibes move on to another setup of shot points to shake.

Each excitation of the vibrator is known as a "sweep" (or sometimes called a "chirp sweep" if really short). Although many sweep patterns are possible, a common one is the "linear" sweep, which is designed to vary between two frequency limits (e.g., between 5 Hz and 150 Hz) over a predetermined period of time in a linear or smoothly varying manner. Other sweeps apply different biases to the duration of time spent in individual frequencies such that more or less time is spent on those frequencies. These are commonly referred to as non-linear sweeps or "gain sweeps". The amplitude of the sweep signal might either be fixed or frequency dependent, depending on a number of factors well known to those of ordinary skill in the art. For example, a sweep is characterized by a starting frequency and ending frequency, tapers and a sweep duration. The moment a sweep starts is also helpful information to separate sweeps.

Technology continues to increase resolution and complexity of seismic systems such as high fidelity vibroseis seismic acquisition including ZENSEIS®. Vibroseis is a method used to propagate energy signals into the earth over an extended period of time as opposed to the near instantaneous energy provided by impulsive sources. The data recorded through vibroseis method must be correlated to convert the extended source signal into an impulse. The source signal using this method was originally generated by a servo-controlled hydraulic vibrator or similar shaker unit mounted on a mobile base unit, but electro-mechanical and pure electric versions have also been developed. Signals transmitted through the earth are reflected and analyzed to identify changes in signal. The exact distance the vibrations travel before being reflected are unknown and the transmission rates of the vibrations through different features is unknown, thus the time from transmission of the signal to recording of the seismic signal is the only direct measure of distance. The exact time is additionally required to extract phase data when more than one vibroseis or other vibrational source is operated simultaneously.

Global Positioning Systems (GPS) are currently used by military and civilians to accurately determine location, direction and rate of movement, as well as time. GPS systems have been used by seismic operators to accurately place vibratory source and sensors during seismic surveys and to provide an accurate time for a GPS survey as a single source of time. Other methods are then used to synchronize time between a central recorder, source, and receivers. These methods include high-precision microsecond time recorders, accurate radio-pulse transponders and receivers, as well as other methods of high accuracy time synchronization. Radio-pulse synchronization requires radio communication with a large number of source and autonomous sensors, requires a powered receiver at each sensor, and a very accurate clock or GPS based timing device to obtain microsecond precision among all of the integrated devices required for seismic surveying.

Prior studies have used the HFVS concept combining the unique sweep encoding advantages of ZENSEIS® and timing synchronization to coordinate source and data recorders for a higher quality survey. By combining the timing accuracy of a GPS with an inexpensive timer or clock, the size of the autonomous data recorder can be dramatically reduced and less energy is required to maintain the system. Because the system has both an accurate near microsecond timing system and inexpensive timer, the system has sufficient accuracy for an HFVS, ZENSEIS®, slip-sweep or similar high production seismic survey method, yet can overcome gaps in communication and radio signal without compromising the data recorded therein. Therefore, an autonomous, continuous recorder may be employed in a seismic survey to potentially eliminate the need of a recording truck and observer as an integral piece of hardware required on the crew. Autonomous recorders are becoming the industry standard for seismic acquisition and continuously recording units are now readily available from many vendors.

In the process of acquiring conventional seismic data, a crew is typically deployed across several tens of square miles of a survey area positioning cables and seismic receivers while seismic sources move from predetermined point to predetermined point to deliver vibrational seismic energy into the earth. The receivers capture the reflected signals that are recorded and subsequently processed to develop images of geologic structures under the surface. The use of autonomous nodes is similar in the conventional seismic method, but the nodes tend to eliminate the positioning of cables and hardware due to the independent nature of the nodes. This is their prime advantage in the field, the reduction of cables and the downtime related to keeping the cables working and undamaged.

Multiple source vibrator technology has been used in land-based seismic surveys for years, and its advantages are well documented. An example of conventional multiple source technology would be "slip-sweep" or HFVS recording. Conventional land-based seismic assays employ multiple, simultaneously energized seismic sources (e.g., trucks with vibrating baseplates) to impart vibratory energy into the ground normally controlled from a central location called the recorder. The imparted vibratory energy travels through the ground, is reflected and/or refracted by various discontinuities in the ground, and the reflected vibratory energy is detected by multiple seismic receivers (e.g., geophones) that are located on the ground at a distance from the seismic sources. The reflected vibratory energy recorded by the receivers is a composite reading representing the reflected energy originating from all the seismic sources. An important step in conventional HFVS multiple source vibrator technology is "source separation" of the composite data into discrete source specific data (i.e.: a "shot record").

In order to allow for HFVS source separation, conventional multiple source vibrator technology requires multiple sweeps to be performed while the seismic sources maintain a fixed location. According to conventional HFVS multiple source vibrator technology, the number of sweeps performed at a fixed source location must be equal to or greater than the number of sources sought to be separated. For example, if four seismic sources are being used in a conventional multiple source vibrator acquisition scheme, at least four sweeps must be carried out for each HFVS source set-up. In addition, conventional HFVS multiple source vibrator technology normally uses orthogonal requires uniquely encoded (e.g., phase, frequency, and/or amplitude encoded) vibratory energy for each sweep, so that source separation of the resulting composite data can be performed.

Optimized phase encoded seismic sweeps by sweeping vibrators on separate source points, sometimes described as Zenseis® seismic prospecting, increases seismic survey productivity and quality over conventional seismic by acquiring data at several source points at the same time and uses optimal phase separation for an improved seismic dataset. If two phase encoded surveys are being conducted at the same time in close proximity, as long as the start times for each sweep are reasonably separated and the actual phase encoding of each crew is optimally tuned, each may generally proceed without time sharing. However, a conventional vibroseis seismic survey crew receives the phase encoded sweeps as significant noise and, heretofore, has not been able to proceed when another crew is in the area.

However, the conventional methods still require the vibratory source and the receiver/recording units to be coupled and normally co-located for synchronizing purposes. Recording trucks with observers are still needed in this process, mainly to ensure the proper recording of data and to properly initiate the sweeps in different vibratory sources ("vibes"). Therefore, there is still the need for a method of autonomous and continuous seismic survey where the receiver/recording units are decoupled from the vibratory source and eliminate the need of observers to save the operation cost.

SUMMARY OF THE INVENTION

Therefore, it is an objective of the present invention to decouple the receiver/recording unit from the vibratory sources and to decouple the operation of the seismic sources from each other.

It is another objective of the present invention to eliminate or minimize the need for observers who coordinate the initiation of vibratory sweeps for different vibratory sources or similar central control of the seismic survey The present invention provides a method for decoupling the receiver/recording units of a seismic survey from the vibratory source using autonomous nodes. In particular, the present invention eliminates the need for a recording truck and observers as the integral piece of hardware required on the crew. In a conventional seismic survey operation, a very large crew is employed in a seismic acquisition, including, among others, the blasters/vibrators who create energy waves in the ground, and observers who coordinate and centrally control and operate the electronic equipment. Because a seismic survey can last for a long period of time, any saving on the operation cost can be substantial.

The present invention employs autonomous recorders to continuously or near continuously record the data collected from the data-acquiring unit, along with the self-initiating sweeps based on the semaphore scheme. The task conventionally assigned to observers, such as making sure that data was recorded and stored, can now be handled by the autonomous recorder because the vibratory source can now be properly initiated independently from the rest of the operation.

The present invention provides a method for autonomously initiating vibratory sources in a seismic survey, comprising: providing m number of vibrator units, wherein each of the vibrator units is capable of scanning, detecting and broadcasting radio waves of predetermined frequencies, and wherein m is a positive integral; scanning a multiplicity of predetermined n channels of frequency, wherein n is a positive integral; detecting and determining if a first channel is available; imparting a first pattern of source seismic signals by a first vibrator unit while broadcasting a blocking tone in the available first channel; ending the first pattern of source seismic signals; and ending the broadcast of the blocking tone in the available first channel; wherein m≥n.

The present invention provides a method for performing continuous seismic survey, comprising the steps of: providing m number of vibrator units, wherein each of the vibrator units is capable of scanning, detecting and broadcasting radio waves of predetermined frequencies, and wherein m is a positive integral; providing at least one recorder operatively coupled to a plurality of data acquiring units, wherein the data acquiring units are capable of acquiring seismic data, and wherein the recorder is capable of autonomously and continuously recording data; scanning a multiplicity of predetermined n channels of frequency, wherein n is a positive integral; detecting and determining if a first channel is available; imparting a first pattern of source acoustic wave by a first vibrator unit while broadcasting a blocking tone in the available first channel; ending the first pattern of source acoustic wave; ending the broadcast of the blocking tone in the available first channel; and continuously recording data by the recorder; wherein m≥n.

The present invention provides an improved method of collecting seismic data by initiating a plurality of sources of seismic energy and recording reflected seismic energy on a data-acquiring unit, the improvement comprising self-initiating sweeps of a plurality of sources of seismic energy using software employing a semaphore scheme and continuously recording the data collected from the data-acquiring unit.

The present invention provides an improved method for synchronizing a continuous seismic survey, a continuous seismic survey requiring initiating a plurality of sweeps from a vibratory source subsystem and recording reflected data with a recording subsystem, the improvement comprising using software based on a semaphore algorithm to autonomously and continuously initiate sweeps, thereby decoupling the vibratory source subsystem from the recording subsystem, and recording reflected data using a continuous recording subsystem As used herein, "receivers" include geophones, hydrophones, accelerometers, electrodynamic receivers, and the like. Receivers may receive one or more than one type of data including vibrational and acceleration data. Vibrational data may be measured between about 1 Hz to 2 KHz, including the primary data range from 4 to 96 Hz, about 8 to 80 Hz, or simply all data less than 160 Hz, and combination thereof. Receivers may include a recorder and local storage or may synchronously/asynchronously transmit data to a remotetranscriber or data collection point. A recorder includes receiver/recorder combinations that automatically record data from the receiver, including systems that record data at the receiver and those that record data at a remote location.

As used herein, "ZENSEIS" refers to a multiple source seismic acquisition technique where each multiple source vibrator emits optimally encoded uniquely (e.g., phase, frequency, and/or amplitude encoded) vibratory energy for each sweep, so that source separation of the resulting composite data can be performed.

Seismic sweeps include exciting at least two seismic sources for a period of 1 to 5 seconds, 2 to 96 seconds, or from 100 milliseconds to more than 120 seconds. Seismic sweeps may be less than approximately 100, 50, 25, 20, 15, 10, 9, 8, 7, 6, 5, 4, 3, 2, or 1 seconds. Sweeps may also be less than approximately 1000, 750, 500, 350, 250, 150, or 100 milliseconds. Sweeps may be independent, pulsed, gradient, or variable dependent upon the vibratory energy required.

Vibratory energy emitted by the seismic sources during each sweep can be encoded for source separation. Seismic sources are capable of emitting vibratory energy of controlled phase, frequency, and amplitude. In one embodiment, vibratory energy emitted by said seismic sources during each sweep can be optimally phase encoded as per the ZenSeis® method. Seismic sources include emission of vibratory energy from 1-150 Hz, 6-120 Hz, 1-60 Hz, 50-150 Hz, 1-80 Hz, 80-160 Hz and the like.

The autonomous, continuous seismic data recorders are commercially available from a number of companies including Oyo Geospace and Fairfieldnodal. For example, Oyo Geospace has the GEOSPACE SEISMIC RECORDER (GSR)™ and Fairfieldnodal Z-Land® are suitable autonomous data recorders. There are many similar units on the market currently, the Global Autoseis, the IONOVA Hawk, and the Sercel Unite to name a few.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DESCRIPTION OF EMBODIMENTS OF THE INVENTION

The invention provides a novel method for autonomous initiation of vibratory sweep without the communication or direction from the recording truck and observer. In particular, the autonomous initiation of sweeps is achieved by employing a semaphore scheme where each vibe scans and detects the availability of predetermined channels of frequency before initiating a sweep. If a channel is available, the first vibe to occupy the channel will start its sweep while broadcasting a blocking tone in the same channel so that no other vibes can overlap on the same channel (thus the same sweep sequence). After the sweep is completed, the vibe will continue broadcasting the blocking tone for a period of time to avoid crosstalk with other vibe set-ups, and then stop.

In computer science, a semaphore is a variable or abstract data type that provides a simple but useful abstraction for controlling access by multiple processes to a common resource in a parallel programming or multi user environment. It is basically a record of how many units of a particular resource are available, coupled with operations to safely adjust the record as units are demanded or becomes free, and if necessary wait until a unit of the resource becomes available. When semaphore is used for a pool of resources, it does not keep track of which of the resources are free, only how many there are. One important property of semaphore variables is that their value cannot be changed except by using the wait and signal function. Counting semaphores are equipped with two operations, historically denoted as V and P. Operation V increments the semaphore S, and operation P decrements it. The value of the semaphore S is the number of units of the resource that are currently available. The P operation wastes time or sleeps until a resource protected by the semaphore becomes available, at which time the resource is immediately claimed. The V operation is the inverse: it makes a resource available again after the process has finished using it.

Figure 1:
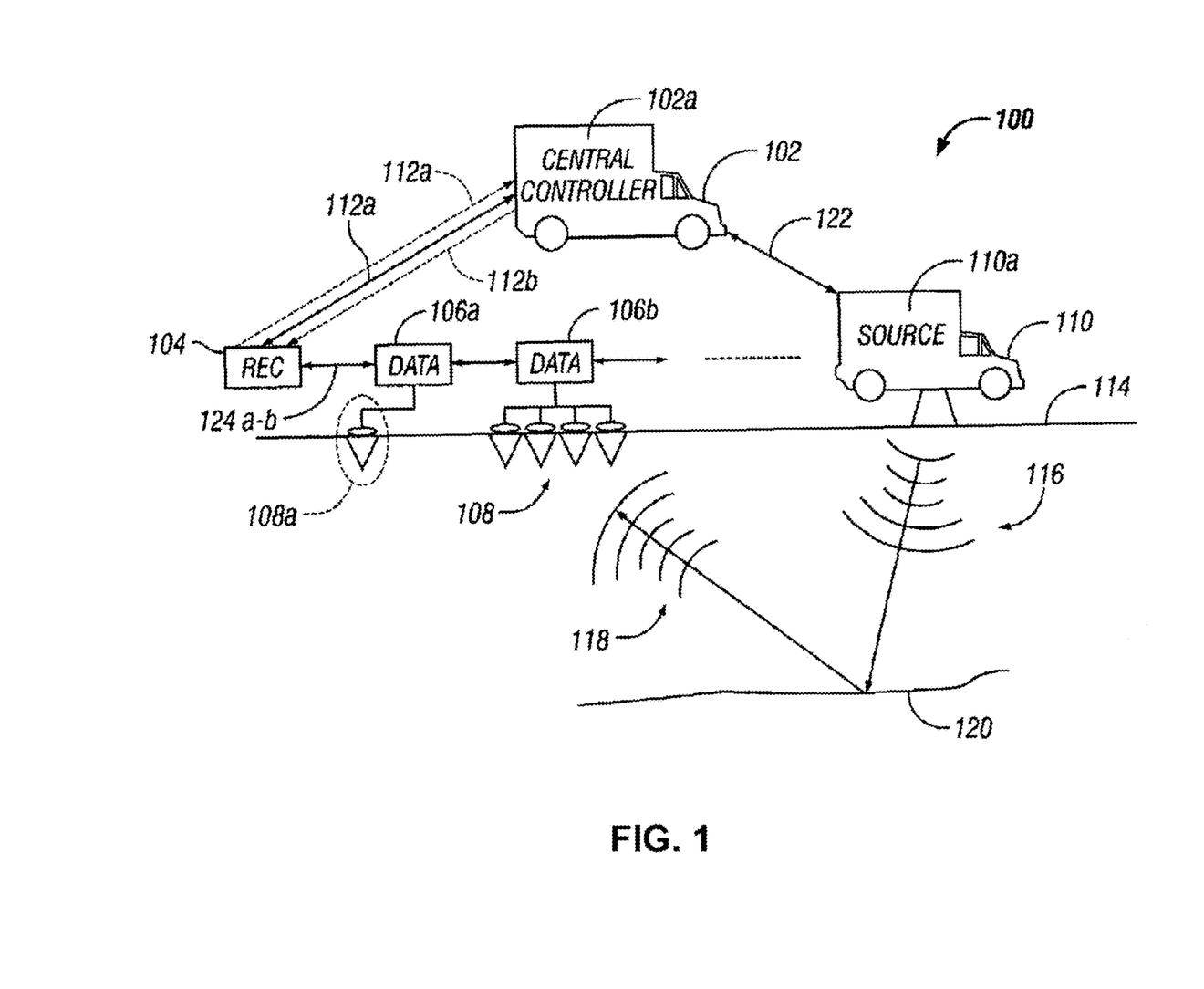
FIG. 1 shows a typical configuration of a seismic survey.

Referring to FIG. 1, which shows a standard seismic survey in operation. In this survey system 100, it includes primary control and recording units for delivering commands to and receiving data signals from one or more remote units in this system 100, for example a vibrator truck 110a or a receiver unit 104. The primary control and recording unit 102 is usually mobile and called "dog house" in the field. It is not necessarily a truck, but can also be housed in any vehicle or carrier, or even installed permanently at a location.

The central controller 102 is connected to one or more receiver units 104 through wired or wireless communication. The receiver units 104 may be located with the central controller 102 or located in the field. A plurality of data acquisition units 106a-b receive data from an array 108 of seismic sensors 108a, such as a geophone, a microphone, an accelerometer-based detector, a hydrophone for wetlands, and the like. Each of the seismic sensors can provide digital or analog output signals regarding the seismic activity it receives.

The seismic activity comes from a seismic source 110, which could include ZENSEIS™, vibroseis, seismic vibrators, airguns, plasma shots, dynamite, and other sources known to one of ordinary skill in the art. Seismic vibrators include trucks, tractors, trailers, boats or ships, submarines, subterranean or other sources that have a base plate that can be brought into contact with the earth or water. A reaction mass is vibrated at varying frequencies against the baseplate to produce vibratory motion (transmit vibration energy) which travels downward into the earth via the base plate. A survey may be designed that uses multiple energy sources, each being activated simultaneously so that the recording instruments capture a composite signal with contributions from multiple vibrators.

In vibroseis the seismic energy source is distributed over a period of time. This distribution of energy over time creates a distinct signal, such as a sweep, in which the signal changes systematically from low frequency at the beginning to high frequency at the end of the source. Dependent upon the desired signal, number of vibroseis being conducted simultaneously, and transmission properties of the ground, different seismic sweep patterns may be developed. ZENSEIS™ sources include vibroseis, seismic vibrator, and combinations thereof. Other multiple source seismic surveys include high fidelity vibratory seismic (HFVS), cascaded HFVS, combined HFVS, slipsweep and the like.

The source 110 is typically linked to the central controller 102 via a two-way communication link 122, which may be analog or digital and wired or wireless. The data sent through the communication link 122 can include control settings, shot commands, location status, source available, source grade and other information useful in managing the survey.

The source 110 itself may include a global positioning system ("GPS") to provide accurate location information to the controller 102. The GPS can also be provided in other components located away from the central controller 102, for example the receiver units 104 and the data acquisition units 106a-b.

In actual operation, the source 110 produces acoustic energy into the ground surface 114 of the earth to set up an acoustic wave 116 travelling generally downward into the earth. The acoustic wave 116 will partially reflect at an impedance change such as a formation boundary 120, thus producing a reflected wave 118 that travels generally back toward the surface 114.

The seismic sensor array 108 will then detect the reflected wave 118. The seismic sensor array 108 then transmits an analog or digital signal to the data acquisition units 106, which then transmit data to the receiver units 104, which then send the data to the central controller 102 for recording and further analysis.

In a conventional seismic survey, a large number of workers are required for a long period of time. For example, seismic drillers drills holes for explosives, and blasters detonate the explosives and control the range of explosion. In non-explosive seismic survey, seismic observers operate, maintain and take charge of the monitoring and recording equipment, and the vibrator operators operate vibrating units that are used instead of explosives, like a vibrator installed on a truck.

Because a seismic survey for one area may take months to complete, maintaining a large crew on site is a substantial operational cost. Therefore it would be beneficial if the recording subsystem is completely divorced from the source subsystem, so that the observer and recording truck at a central location are no longer required. The system may work more efficiently, and substantial cost may be saved.

The present invention is realized by using a radio tone based system that uses a continuously recording autonomous data recorder to record the seismic data. The present invention also employs the semaphore concept in designing the method of controlling the source subsystem. As an example, we will consider the vibrator example of the source subsystem. Each unit of the vibrator subsystem is capable of scanning different radio frequencies and detecting whether a particular frequency is in use. If not, the vibrator unit will start its sweep and start broadcasting a tone on this frequency. The next vibrator unit to setup would then scan the frequencies and find that one in use and move to another frequency and start its sweep. This will continue until all the units that make up the 4 vibe setup this example in the vibrator subsystem are conducting sweeps. Upon completion of sweep number one to 4, the vibrator unit would continue broadcasting the tone long enough to avoid cross talk with other setups and then stop. Other vibrator units would immediately hear by the radio that channel one is open and the first available vibrator unit that is setup would start to sweep using channel one. In the meantime the other 3 vibes of the first setup would still be broadcasting and would complete their sweeps and once sufficient time had passed for the cross talk to be avoided, they would stop broadcasting and that setup would be completed. Once any individual vibrator has completed its sweeps at a location, it would move to the next location and start scanning the frequencies looking for a gap that it could use to start production again. By using the blocking frequencies this way, the problem of simultaneous initiation of the sweep by two vibes with the same phase encoding is eliminated and no vibes can be operating that are not part of the primary setup. When used with ZenSeis® phase encoding, multiple setups could be run at once as long as the different frequencies for blocking tones are coded with different ZenSeis® optimal phase encoding.

Autonomous Recorder and Synchronization

Figure 3:
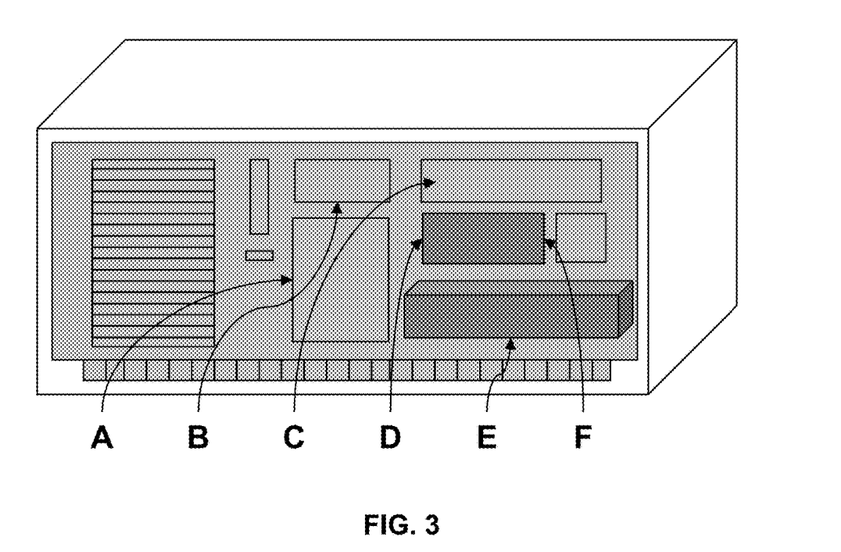
FIG. 3 is an exemplary autonomous recorder as used in the present invention.

As shown in FIG. 3, an autonomous recorder is provided that contains a seismic receiver (A), a field timer (B), a processor (C), a data transmitter (D), a battery (E), and a GPS unit (F). The autonomous continuously recording recorder transmits a seismic signal and field time record directly to a separate, remote transcriber where the seismic data and time are recorded along with data from other recorders. The filed timer may be a separate timer or a computer counter incorporated into the processor.

The autonomous recorder may contain a geophone, accelerometer, directional 3-way accelerometer, one or more solar panels, a GPS processor with built-in computer-based timer, a memory buffer and transmitter. The autonomous recorder stores seismic, timer, and GPS data in a buffer memory. The data is transmitted during and/or after seismic survey when the central transcriber requests the stored data, at specific time intervals or upon node recovery from the field prior to redeployment. The system may have multiple redundant components to monitor timing drift, provide a "sleep battery," multiple processors, multiple transmitters, and other systems required for operation of individual components or the system as a whole.

Initiating Sweeps

Figure 4:
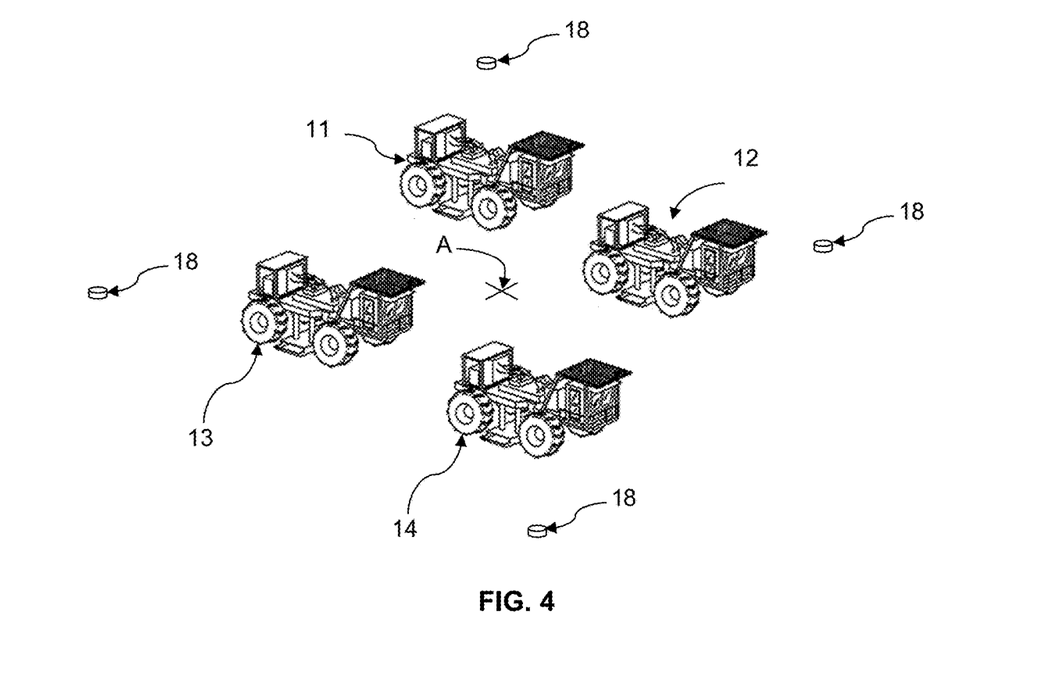
FIG. 4 is a schematic view of a four-vibe arrangement as used in the present invention.

An example of a seismic survey crew is shown in FIG. 4, where a team 10 of four sweep vibes 11, 12, 13, and 14 are on 4 different shot points and ready to record data. This forms a setup in the terminology of HFVS or ZenSeis®. A plurality of receivers (autonomous nodes) 18 are set to record the signals continuously arriving back to the surface after reflecting off of subsurface structures. In the data set, all the energy put into the ground by the team 10 are initially seen as if from the single point and are essentially summed to be equivalent to one very big vibe. In some embodiments, each shot point contains one vibe and each vibe represents a different location. The resultant setup must then be taken to processing for the inversion, summation and separation step which will then break the data back out into the 4 individual shot points in the survey. The source points may be arranged in a variety of arrays depending on the paradigms of the designing geophysicist. This is the near ideal situation where every vibe is on its shotpoint at the start of the sweeping and there are no other vibes available or operating in the area.

Figure 2:
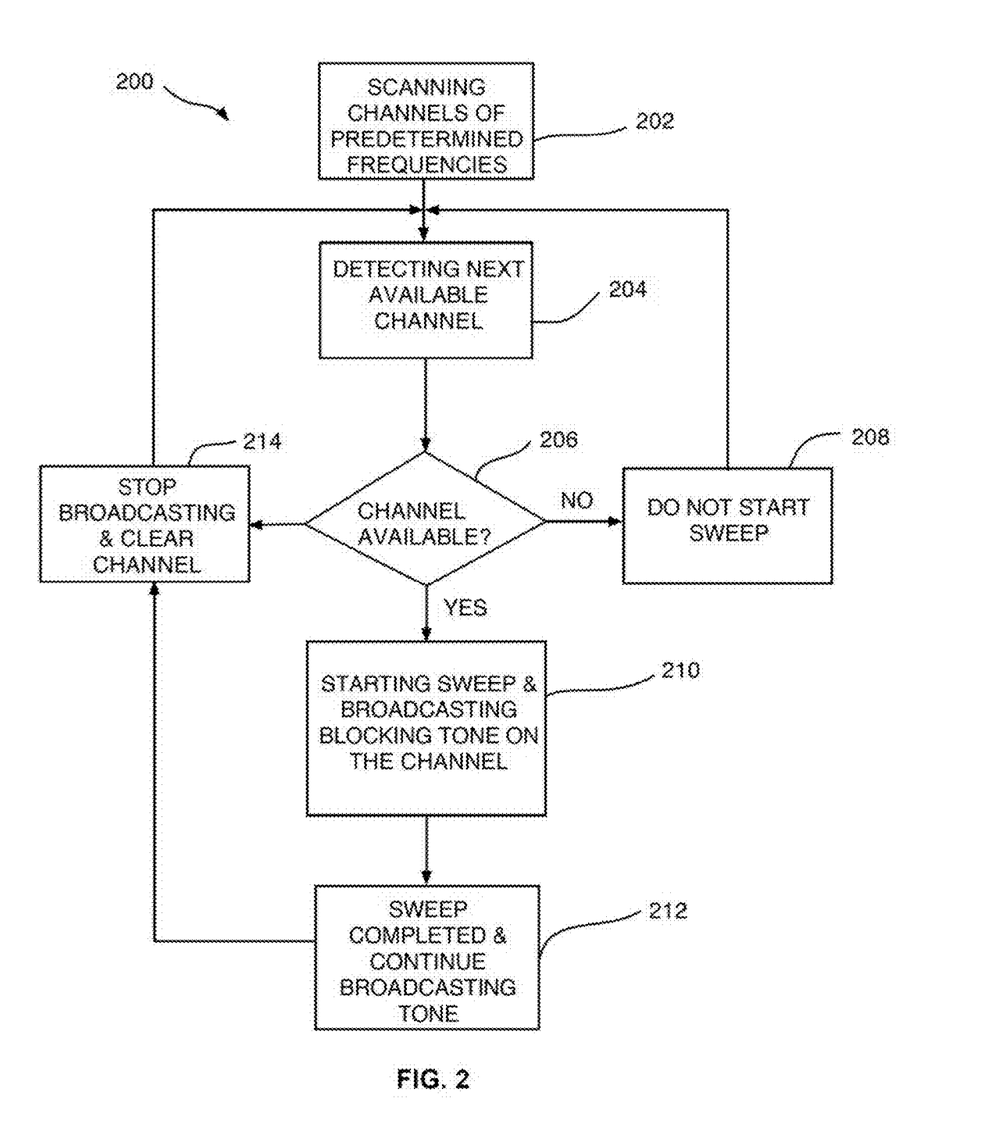
FIG. 2 is a flow diagram illustrating the method of the present invention.

In the real world, it is inefficient to wait for all 4 vibes to get in position and it is inefficient to have only one group of 4 vibes operating at once. A more normal approach would be to have 10 or more vibes in the field each searching for source points to take. Upon locating a source point to take, the vibe would set up and start to use the present invention is made with reference to FIG. 2. FIG. 2 is a flow chart illustrating the steps of this method. In the present method, preferably a predetermined number of frequency channels are provided each one corresponding to a predetermined ZenSeis® compatible phase encoding for each channel. The channels are arranged in the priority of acquisition so primary could be the first four channels and the secondary be the second for channels, wherein the number of vibrator units is equal to or greater than the number of channels as an example. However, the number of vibes and channels can vary depending on different settings or applications.

The method 200 starts with step 202 for scanning in the predetermined frequency channels. Each of the vibes is equipped with a digital radio and can therefore be programmed to scan predetermined frequencies. In step 204, a computer in the first vibe will listen on the digital radio for a blocking tone on any of the eight frequencies. In step 206, if the computer does not hear a blocking tone on channel one, it will start its sweep on channel one and start broadcasting a blocking tone on channel 1, as shown in step 210. After the sweep is completed, the vibe continue broadcasting the blocking tone long enough to avoid cross talk with other set-ups, as shown in step 212 and then continue through sweeps 2 through 4. After that, the first vibe will stop the broadcasting and clear channel 1, move to a new source location and restarting the process.

In the meantime, the other 9 vibrators are looking for source points and upon finding one move to step 206, if, for example, the first vibe has already occupied channel 1, the second vibe therefore determines that channel 1 is not available and proceeds to step 208 without starting any vibration. The second vibe will then start again from step 204 to see if channel 2 is available which it is and will then start shaking the sweep and broadcasting the blocking tone just as vibe 1 did. The process will continue to repeat the loop until one of the predetermined channels is available to proceed for each of the first 8 vibes to find a source point. At the same time, the last two vibes to find a source point will be sitting waiting for the broadcasting tones to clear so they can start the next setup. This will occur when vibe 1 completes its setup and moves to the next location. At that time the ninth vibe will start the third setup using the ZenSeis® optimal phase encoding for sweep 1. This process would continue until either the crew shut down for the day or the survey was completed.

By using the method of the present invention along with the autonomous, continuous recorder, the recording trucks and observers can be eliminated from the hardware required on the seismic survey crew. The tasks that the observer held of making sure the data was recorded and stored is now handled independently by the vibrators themselves by using a blocking signal that could either be a simple tone or encoded signal that informs the other vibes in the network that this channel is taken and go find another channel. The tasks that the observer held of directing the source generators (i.e. vibes, explosives and the like) can now be handled in the field via radios or preplotted survey plans. The vibes can now be initiated autonomously through this semaphore scheme. The transcriber operator now works out of the transcriber truck and his job now becomes a logistics role of directing the vibes where they can work in terms of equipment layouts and watches for missed source points and locations to help with the efficiency of the survey. He coordinates via voice or electronic communication to the vibe drivers where to go next.

The scope of protection for this invention is not limited by the description set out above, but is only limited by the claims that follow. That scope of the invention is intended to include all equivalents of the subject matter of the claims. Each and every claim is incorporated into the specification as an embodiment of the present invention. Thus, the claims are part of the description and are a further description and are in addition to the preferred embodiments of the present invention. The discussion of any reference is not an admission that it is prior art to the present invention.

REFERENCES

All references, publications, patents, patent applications cited herein are hereby expressly incorporated by reference for all purposes. The discussion of any reference is not an admission that it is prior art to the present invention, especially any reference that may have a publication data after the priority date of this application. Incorporated references are listed again here for convenience:

1. U.S. Pat. No. 7,295,490.
2. US-2010-0020641.
3. US-2011-0013482, WO 2010/053752
4. US-2011-0019502, WO 2010/053787
5. US-2010-0208554, WO 2010/093896

6. US-2012-0275266, WO 2012/148816
7. US-2012-0281499, WO 2012/154395
8. US-2012-0051181, WO 2011/137028

The invention claimed is:

1. A method for autonomously initiating vibratory sources in a seismic survey, the method comprising:
provided m number of vibrator units, wherein each of the vibrator units is capable of scanning, detecting and broadcasting radio waves of predetermined frequencies, and wherein m is a positive integral, wherein each of the vibrator units emits uniquely encoded vibratory energy;
scanning a multiplicity of predetermined n channels of frequency, wherein n is another positive integral that is less than or equal to m;
determining if a first channel is available from the multiplicity of predetermined n channels of frequency;
imparting a first pattern of source seismic signals by a first vibrator unit of the vibrator units while simultaneously broadcasting a blocking tone on the first channel after determining that the first channel is available;
determining if a second channel is available from the multiplicity of predetermined n channels of frequency after detecting the blocking tone on the first channel using a second vibrator unit of the vibrator units;
imparting a second pattern of source seismic signals by the second vibrator unit while simultaneously broadcasting a second blocking tone on the second channel after determining that the second channel is available, the first pattern of source seismic signals and the second pattern of source seismic signals being imparted simultaneously at least in part;
ending the first pattern of source seismic signals; and
ending the broadcast of the blocking tone on the first channel after a length of time elapses from when the first pattern of source seismic signals ends.

2. The method of claim 1, wherein the vibrator units are ZENSEIS™, vibroseis, seismic vibrators, airguns, plasma shots, or dynamite.

3. The method of claim 1, wherein m=n=4.

4. The method of claim 1, wherein the first pattern of source seismic signals is a vibration sweep with varying frequencies.

5. The method of claim 4, wherein the vibration sweep has frequencies increasing from low to high.

6. The method of claim 5, wherein the vibration sweep has frequencies increasing from 5 to 500 Hz.

7. A method for performing continuous seismic survey, the method comprising:
providing m number of vibrator units, wherein each of the vibrator units is capable of scanning, detecting and broadcasting radio waves of predetermined frequencies, and wherein m is a positive integral, wherein each of the vibrator units emits uniquely encoded vibratory energy;
providing at least one recorder operatively coupled to a plurality of data acquiring units, the at least one recorder being completely decoupled from the vibrator units, wherein the data acquiring units are capable of acquiring seismic data, and wherein the recorder is capable of autonomously and continuously recording the seismic data;
scanning a multiplicity of predetermined n channels of frequency, wherein n is another positive integral that is less than or equal to m;
determining if a first channel is available from the multiplicity of predetermined n channels of frequency;
imparting a first pattern of source acoustic wave by a first vibrator unit of the vibrator units while simultaneously broadcasting a blocking tone on the first channel after determining that the first channel is available;
determining if a second channel is available from the multiplicity of predetermined n channels of frequency after detecting the blocking tone on the first channel using a second vibrator unit of the vibrator units;
imparting a second pattern of source acoustic wave by the second vibrator unit while simultaneously broadcasting a second blocking tone on the second channel after determining that the second channel is available, the first pattern of source acoustic wave and the second pattern of source acoustic wave being imparted simultaneously at least in part;
ending the first pattern of source acoustic wave;
ending the broadcast of the blocking tone on the first channel after a length of time elapses from when the first pattern of source acoustic wave ends; and
continuously recording data corresponding to the first pattern of source acoustic wave and the second pattern of source acoustic wave by the recorder.

8. The method of claim 7, wherein the vibrator units are ZENSEIS™, vibroseis, seismic vibrators, airguns, plasma shots, or dynamite.

9. The method of claim 7, wherein the data acquiring units are geophones, hydrophones, accelerometers, electrodynamic receivers, or combinations thereof.

10. The method of claim 7, wherein m=n=4.

11. The method of claim 7, wherein the first pattern of source acoustic wave is a vibration sweep with varying frequencies.

12. The method of claim 11, wherein the vibration sweep has frequencies increasing from low to high.

13. The method of claim 12, wherein the vibration sweep has frequencies increasing from 5 to 500 Hz.

14. A method for performing continuous seismic survey, the method comprising:
scanning a digital radio for a blocking signal on a plurality of channels using a first vibrator unit in a vibrator arrangement, each of the plurality of channels having a different predetermined frequency;
determining that the blocking signal is not being broadcast on a first channel of the plurality of channels using the first vibrator unit;
autonomously imparting a first pattern of source seismic signals emitted at a first uniquely encoded vibratory energy using the first vibrator unit;
broadcasting a first corresponding blocking signal on the first channel simultaneously with the first pattern of source seismic signals being imparted using the first vibrator unit;
detecting the first corresponding blocking signal on the first channel while scanning the plurality of channels using a second vibrator unit in the vibrator arrangement;
determining that the blocking signal is not being broadcast on a second channel of the plurality of channels using the second vibrator unit;
autonomously imparting a second pattern of source seismic signals emitted at a second uniquely encoded vibratory energy using the second vibrator unit;
broadcasting a second corresponding blocking signal on the second channel simultaneously with the second pattern of source seismic signals being imparted using the second vibrator unit, the first pattern of source seismic signals, the second pattern of source seismic signals, the first corresponding blocking signal, and the second corresponding blocking signal occurring at least partially simultaneously;

ending the first pattern of source seismic signals;

continuing to broadcast the first corresponding blocking signal on the first channel until a length of time elapses from when the first pattern of source seismic signals ends.

15. The method of claim 14, wherein the length of time prevents crosstalk with another arrangement of vibrator units.

16. The method of claim 14, further comprising:

continuously and autonomously recording data using at least one recorder in response to imparting at least one of the first pattern of source seismic signals and the second pattern of source seismic signals.

17. The method of claim 16, wherein the at least one recorder is completely decoupled from the first vibrator unit and the second vibrator unit.

18. A system for performing continuous seismic survey, the system comprising:

a first vibrator unit in a vibrator arrangement, the first vibrator unit autonomously imparting a first pattern of source seismic signals emitted at a first uniquely encoded vibratory energy corresponding to a first channel of a plurality of channels, each of the plurality of channels having a different predetermined frequency, the first vibrator unit broadcasting a first blocking signal on the first channel simultaneously with the first pattern of source seismic signals being imparted, the first vibrator unit continuing to broadcast the first blocking signal until a length of time elapses from when the first pattern of source seismic signals ends; and a second vibrator unit in the vibrator arrangement, the second vibrator unit detecting the first blocking signal on the first channel and in response autonomously imparting a second pattern of source seismic signals emitted at a second uniquely encoded vibratory energy corresponding to a second channel of the plurality of channels, the second vibrator unit autonomously selecting the second channel by determining that a blocking signal is not being broadcast on the second channel, the second vibrator unit broadcasting a second blocking signal on the second channel simultaneously with the second pattern of source seismic signals being imparted, the first pattern of source seismic signals, the second pattern of source seismic signals, the first blocking signal, and the second blocking signal occurring at least partially simultaneously.

19. The system of claim 18, further comprising:

at least one recorder continuously and autonomously recording data captured in response to imparting at least one of the first pattern of source seismic signals and the second pattern of source seismic signals.

20. The system of claim 19, wherein the at least one recorder is completely decoupled from the first vibrator unit and the second vibrator unit.

* * * * *